INVENTORS
ALBERT M. ROCKWELL
ALBERT H. BEAUFRERE
BY
Ernst D. Givm
ATTORNEY

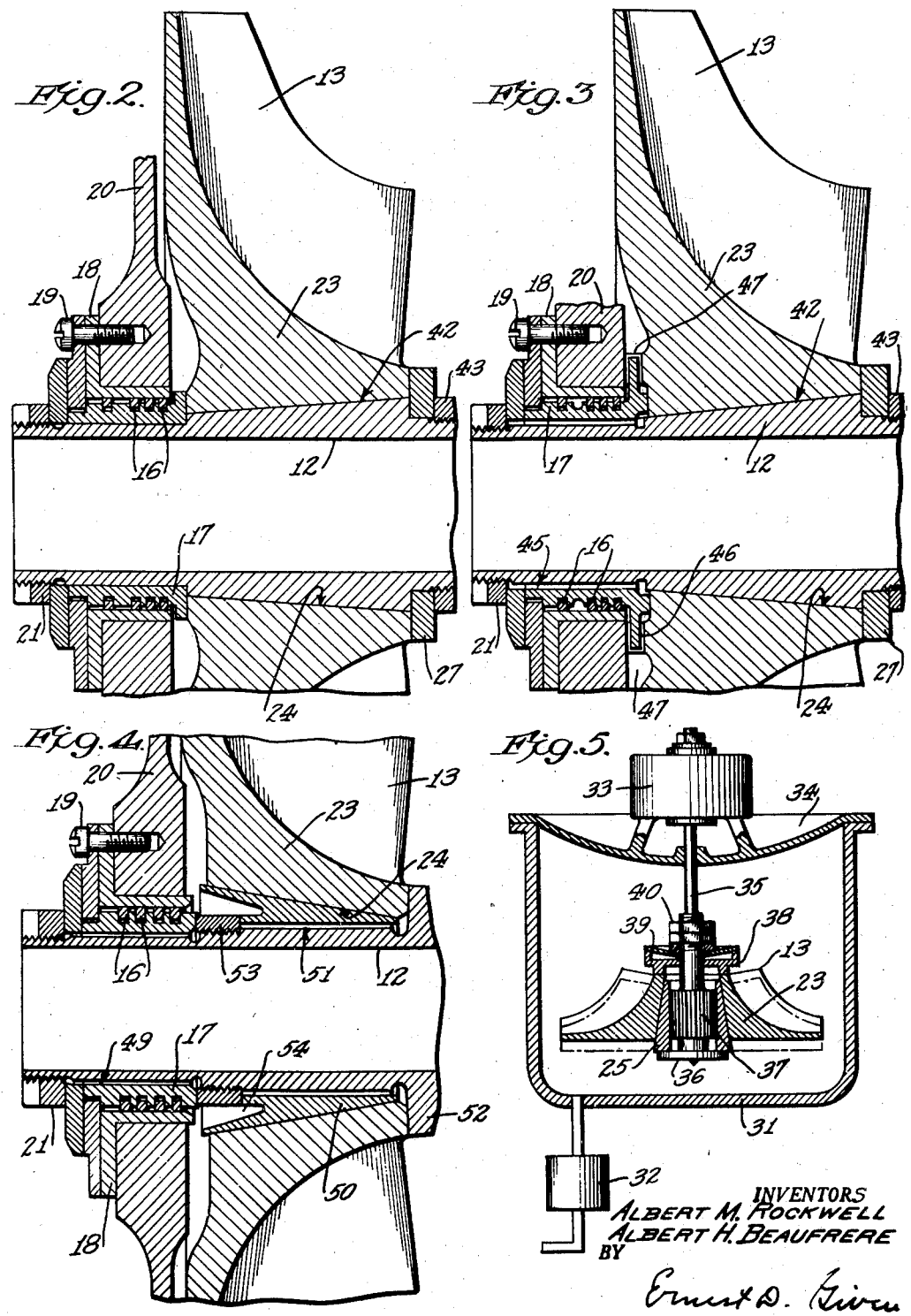

March 30, 1948.  A. M. ROCKWELL ET AL  2,438,866
IMPELLER MOUNTING
Filed June 1, 1945   3 Sheets-Sheet 3
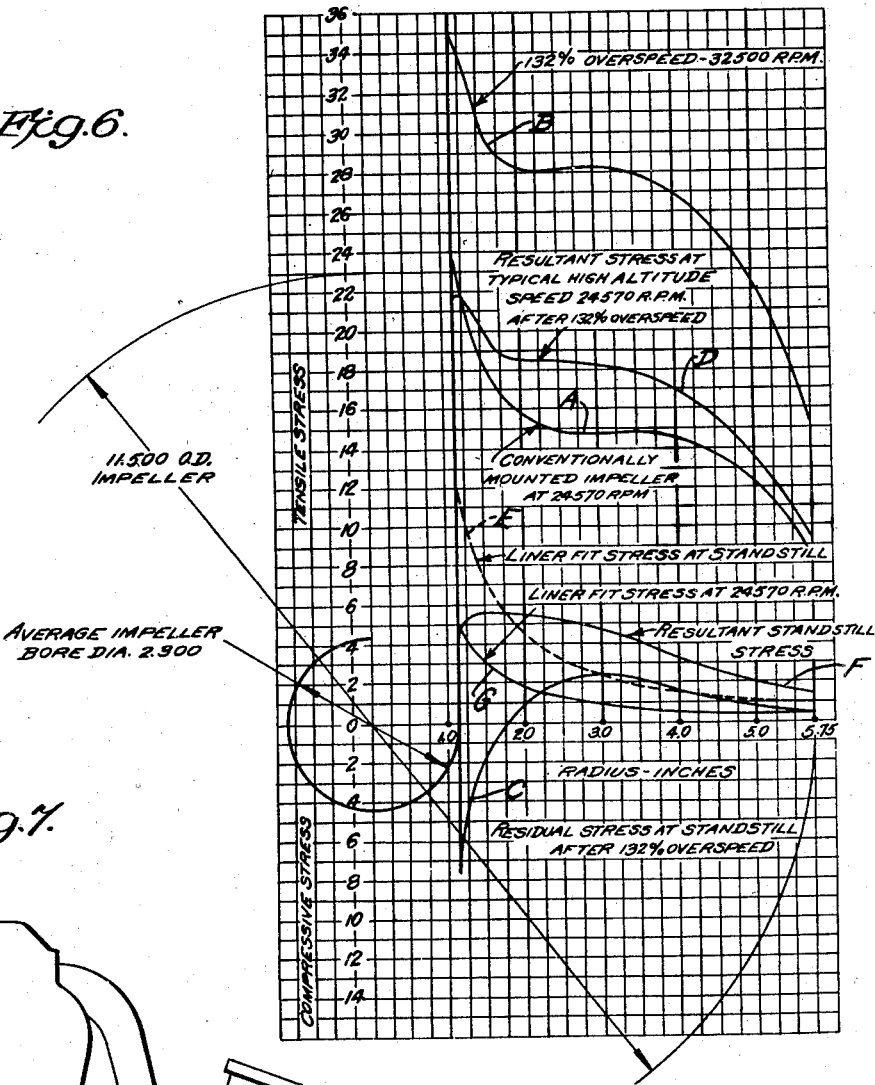
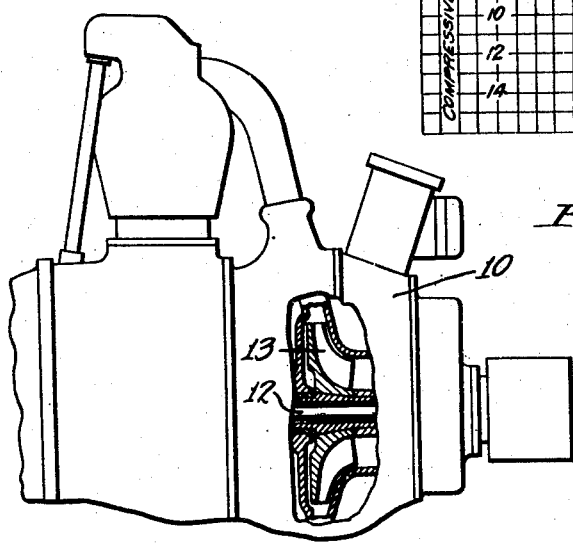
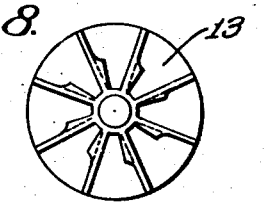
INVENTORS
ALBERT M. ROCKWELL
ALBERT H. BEAUFRERE
BY
ATTORNEY Patented Mar. 30, 1948

2,438,866

UNITED STATES PATENT OFFICE 2,438,866

IMPELLER MOUNTING

Albert M. Rockwell, Glastonbury, and Albert H. Beaufrere, Manchester, Conn., assignors to United Aircraft Corporation, East Hartford, Conn., a corporation of Delaware Application June 1, 1945, Serial No. 597,129

16 Claims. (Cl. 230—134)

This invention relates to impellers for the superchargers of internal combustion engines, as well as to other composite rotatable bodies, such as mechanical rotors which are secured to rotatable supports and are likely to encounter excessive strains and stresses which may result in weakening or bursting the bond between the rotor and the shaft.

An object of the invention is to strengthen the bond between a rotor of the above type and its driving support or shaft.

Another object of the invention is to provide a more uniform distribution of stresses during the high speed operation of a device of the type specified.

Still another object is to shrink an impeller or the like on a shaft with a sufficiently tight fit to remain tight at any expected service speed.

Various other objects and advantages will be apparent as the nature of the invention is more fully disclosed.

The present invention is a result of studies which we have made of the tensile stresses encountered by the impellers and inducers of internal combustion engine superchargers operating at high speeds, one illustration being in the power plants of diving-types of aircraft. We have found, for example, that the rivet holes which are customarily employed to attach the steel liner to the hub of an aluminum impeller are stress raisers of a high order, and the same thing is true of involute splines, square splines, or 60° V-splines, which have also been employed for this and similar purposes. We realized that if we could eliminate these undesirable bonds from the design, a much stronger impeller would result.

We have now succeeded in accomplishing the desired result by shrinking the impeller on its shaft with a perfectly plain bore, and with a sufficiently tight fit to remain tight at any expected service speed. When an impeller is turned at a greater speed than any expected service speed, the bore will distort to a diameter greater than that assumed at said service speed, because of the additional stresses produced within the impeller. We take advantage of this fact by fitting a driving shaft to this enlarged bore, which exists at some speed greater than service speed, with the result that, when the speed is reduced, the impeller shrinks tight on the shaft.

In carrying out the invention the member to be shrunk upon the support, and the support itself, are both of circular cross-section and may comprise either cylindrical surfaces or tapered conical surfaces. The specific method disclosed herein for purposes of illustration is to make the bore of an impeller in the form of a tapered cone, place it on a correspondingly tapered shaft, and then rotate the shaft carrying the impeller. As the speed of rotation increases, the impeller is caused to slide or climb up the cone of the shaft, either by its own thrust or by some external means as hereinafter described. The speed of rotation is increased to the point where the impeller is far enough up the conical shaft to produce the desired tight fit when run at service speed.

The foregoing method of assembly possesses a number of important advantages, including: (1) It accomplishes an overspeed inspection of the individual impellers during assembly. This will immediately eliminate any impellers which may have flaws included in the material, where visual inspection cannot find them. (2) A tight fit is accomplished without the use of heat. This fit remains tight at the highest service R. P. M. (3) The smooth bore eliminates stress concentrations caused by splines, rivet holes, etc., in the highest stress regions of the impeller. (4) Better stress distribution between the material adjacent to the hub and the material around the periphery of the impeller results from overspeeding the assembly when the impeller is run at service speeds. (5) A higher endurance limit for the aluminum or other material used in the impeller can be realized near and at the bore.

By using the friction of the tight fit of the impeller on its shaft as a driving means, furthermore, our construction provides a safety feature which eliminates the possibility of the impeller accidentally reaching bursting speed, regardless of engine speed. To illustrate this, assume an engine overspeeding sufficiently to burst the conventional "spline-driven" impeller. As the speed increases, the impeller bore tends to grow. With our smooth bore mounting a speed is reached where the tightness of the fit between the impeller bore and its shaft is no longer sufficient to maintain the friction necessary to transmit the required driving torque; then slip occurs. As the shaft speed is further increased, slip increases while the impeller remains at the speed where the friction of the remaining tight fit balances the required driving torque.

Although the novel features which are characteristic of this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

In the drawings:

Figs. 2, 3 and 4 are similar views, partly broken away, illustrating three different modifications in details of construction and assembly;

Fig. 5 is a vertical sectional view illustrating a method and apparatus which may be employed for shrinking the impeller hub on its driving shaft;

Fig. 6 is a graph illustrating the comparative stresses in conventionally mounted impellers, and in impellers mounted according to the present invention, under various conditions;

Fig. 7 is a diagrammatic view, partly in section, illustrating the mounting of an impeller in the supercharger of an internal combustion engine; and Fig. 8 is a plan view of said impeller.

Figure 1:
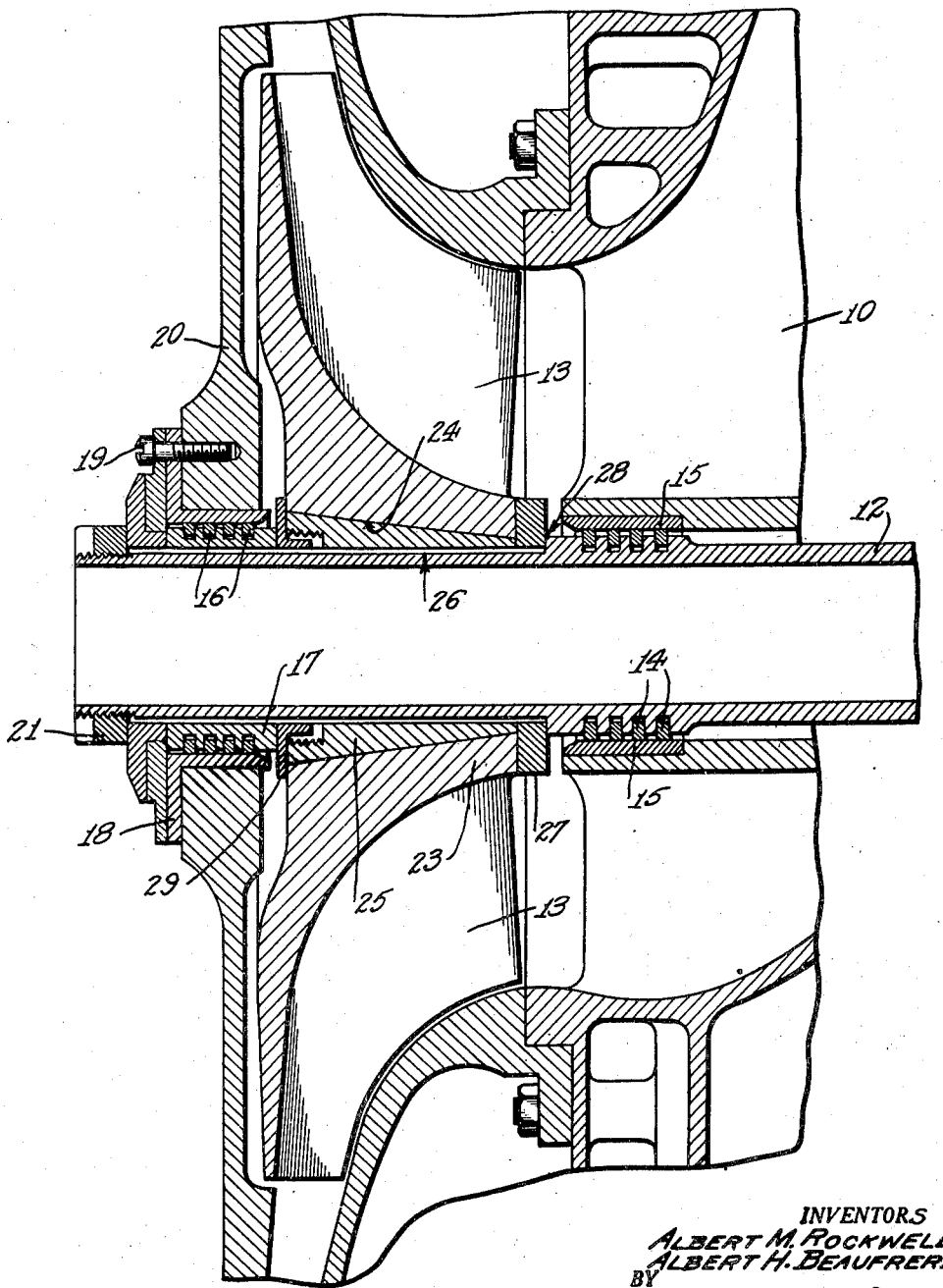
Fig. 1 is a vertical sectional view through a supercharger impeller which is secured to its driving shaft in accordance with the present invention.

In the following description certain specific terms are used for convenience in referring to the various details of the invention. These terms, however, are to be interpreted as broadly as the state of the art will permit.

Fig. 1 shows the stationary casing 10 of an internal combustion engine, the general assembly of which is diagrammatically illustrated in Fig. 7, and through this casing extends the rotatable engine shaft 12 to which the supercharger impeller 13 is secured in a manner presently to be described.

Sealing rings 14 seal the space between the shaft 12 and a bushing 15 on casing 10; and similar sealing rings 16 are arranged between a collar 17 splined to shaft 12 and a flanged bushing 18 which is secured by screws 19 to the inner wall 20 of the engine casing. The assembly includes a suitable spanner nut 21 which is threaded on shaft 12 to retain the parts as illustrated.

The impeller 13, which in the embodiment of the drawing is aluminum alloy AMS4130, has a hub 23 containing a tapered conical bore 24 which is shrunk upon a correspondingly tapered conical stub shaft 25 in accordance with the present invention. After the impeller is shrunk upon the stub shaft 25, the said stub shaft, which is internally splined, is fitted upon the engine shaft 12 and meshed with splines 26 on said shaft 12. The impeller 13 and its stub shaft 25, when thus assembled on engine shaft 12, are restrained from longitudinal movement on said shaft 12 by a retaining collar 27 which abuts against a ledge 28 on shaft 12 and by a flanged retaining ring 29 which abuts against the splined collar 17, as illustrated.

A suitable method and apparatus for shrinking the impeller 13 on the stub shaft 25 are diagrammatically illustrated in Fig. 5. The closed chamber 31 in Fig. 5 is adapted to be evacuated by a suitable vacuum pump 32. The spinning rig includes a variable speed motor 33 mounted on the cover 34, and an arbor 35 which extends downwardly within the chamber 31. A flange 36 on the lower end of arbor 35 serves as a seat for the stub shaft 25, and a toothed or splined boss 37 on arbor 35 is adapted to mesh with the internal splines on stub shaft 25 for the purpose of rotating the latter.

The hub 23 of impeller 13 is placed on the stub shaft 25 so that the two tapered portions match, and the assembled parts are then placed upon the arbor 35 with the large end of the stub shaft seated on the flange 36 and the internal splines thereof meshing with the splined boss 37 on the arbor. A slidable carriage 38 on arbor 35 is lowered into engagement with the hub 23 of impeller 13, and a suitable spring such as the bellville spring 39 is forced against the carriage 38 by nuts 40 threaded on the arbor 35, so that said spring 39 exerts a continuous pressure on the impeller and thus tends to push or force the conically bored hub of the impeller outwardly along the incline of the stub shaft 25. With the parts arranged as illustrated in Fig. 5, the chamber 31 is evacuated to remove deleterious air currents and pressure, after which the motor 33 is set in operation.

As the speed of the motor 33 increases, the pressure of the bellville spring 39, and the thrust of the impeller 13 itself, causes the impeller to slide along the inclined conical surface of the stub shaft 25. The speed of rotation is increased to the point where the impeller is far enough up the stub shaft to produce the desired tight fit when run at service speed. This position is illustrated in dotted lines in Fig. 5.

Fig. 2 shows a modification of the invention which eliminates the splines on the engine shaft 12, and in which the tapered conical bore 24 of impeller hub 23 is shrunk directly upon a correspondingly tapered conical portion 42 of the shaft 12 itself. In this embodiment of the invention the collar 17 is also suitably shrunk upon the shaft 12 and itself forms an abutment for restraining longitudinal movement of the impeller. A spanner nut 43 threaded on the shaft 12 serves to hold the retaining collar 27 in place. If desired to facilitate assembly, the shaft 12 may itself comprise a stub shaft suitably coupled to a main engine driving shaft.

In Fig. 3 the construction differs from that of Fig. 2 only in that the collar 17 is splined on the shaft 12 at 45 and is provided with a plurality of upstanding peripheral lugs or fingers 46 which engage in corresponding slots 47 formed on the inner face of impeller hub 23, thus providing a positive driving connection between shaft 12 and impeller 13 independent of the frictional connection between the tapered conical surfaces 24 and 42. In this embodiment of the invention, as in all the others, the impeller hub 23 is shrunk upon the tapered conical portion 42 of shaft 12 at a point corresponding with a speed of rotation which is greater than any expected service speed.

In the embodiment shown in Fig. 4, the collar 17 is splined on the shaft 12 at 49, and a tapered conical stub shaft 50, which is spun-fitted to the tapered conical bore 24 of impeller hub 23, is splined on the shaft 12 at 51. A retaining flange 52 formed on the shaft 12, and a retaining nut 53 threaded upon said shaft 12, restrain the stub shaft 50 and the impeller 13 against longitudinal movement. The inner large annulus of stub shaft 50 may be recessed or thinned as illustrated at 54 to provide flexibility and relieve the relatively tight fit.

The operational advantages of the invention are graphically illustrated in Fig. 6. Stress analyses of impellers run at normal speeds show that the centrifugal force creates tensile stresses which are greatest in a tangential direction, near and at the bore, and in most conventional installations, are considerably less in the outer periphery as indicated by curve "A" in Fig. 6. Not considering the stress concentration created by the rivet holes in a conventional impeller design, this is the characteristic tangential stress curve at 24,570 R. P. M. for a typical conventional impeller design as well as our new design, without any overspeeding. This characteristic of the stress distribution pattern within the impeller can be capitalized upon by prestressing the material near and at the bore of the impeller, so that the impeller, when standing stationary, will have the tangential stress near, and at the bore, in compression. When such impellers are run, any centrifugal stresses being tensile will be decreased by the compressive residual stresses near, and at, the bore of the impeller. In the outer periphery the residual stresses of a pre-stressed impeller are tensile and, therefore, will add to the stresses created by centrifugal force. However, since an overspeeded impeller creates residual stresses which affect a decrease to the maximum stresses and an increase to the minimum stresses, a more uniform stress distribution at normal speeds will result by overspeeding.

The pre-stressing is accomplished by overspeeding the impeller assembly to such a speed that the material around the periphery of the impeller is stressed near the yield strength of the material. Considering the stress distribution pattern of the impeller and the fact that the centrifugal stresses throughout the impeller depend on the speed, the material near and at the bore of the impeller will be stressed above the yield strength and will take a considerable permanent deformation, as represented by curve "B" in Fig. 6.

Now, when the impeller is allowed to slow down from the high overspeed, the material in the outer portion, not having been stressed to any greater extent beyond the elastic limit, will have a greater ability to contract to its original shape than the inner portion which has taken a considerable permanent set. Upon coming to rest, the impeller will have, therefore, residual stresses in it, such as shown by curve "C" in Fig. 6. As these residual stresses are compressive near, and at, the bore, and tensile in the rest of the impeller, they will combine favorably with the centrifugal tensile stresses produced when the impeller is running and result in a more uniform stress distribution and a lower maximum stress such as indicated by curve "D" in Fig. 6. It will be noted that curve "D" takes into account the additional stress created by the steel liner pressure at the bore of the impeller. This liner fit stress is considerable at standstill as indicated by curve "E" in Fig. 6, and when combined with the residual stress results in a stress distribution at standstill such as shown by curve "F," but as the liner fit stress decreases with the square of the speed, and the residual stress remains the same, a more uniform stress distribution will result from overspeed and will, of course, never effect an increase to the maximum stress at the maximum speed of the impeller. Curve "G" shows the liner fit stress at 24,570 R. P. M. It will be noted that curve "A" representing the present conventional design would have a still higher peak stress at the bore if that assembly accomplished the same tight fit as the impeller assembly method of the present invention. Of course, an impeller that remains tight to its shaft at all speeds is desirable from a standpoint of balance and wear, but is quite impossible to obtain with previous methods of assembly.

Since the material used for the impellers is ductile, they may be stressed considerably beyond their elastic limit before rupture. This property of the material, as shown above, can be used to advantage to lessen the possibility of failure by rupture and fatigue. It is to be noted that overspeeding increases the fatigue life of the material in another way, for even at the lower speeds of the impeller, any aluminum alloy impeller will be stressed beyond the elastic limit of the material. Therefore, if the elastic limit has not been raised by overspeeding, an impeller will repeatedly go from an elastic state to a plastic state. Any material so stressed will have its fatigue endurance life severely impaired.

Although certain specific embodiments have been shown and described herein for purposes of illustration, it will be evident to those skilled in the art that the invention is capable of various modifications and adaptations within the scope of the appended claims.

The invention claimed is:

1. Apparatus for shrinking a conically tapered member on a correspondingly tapered support, comprising a chamber, means for evacuating said chamber, a rotatable arbor in said chamber, means for securing said tapered support to said arbor while leaving said conically tapered member free to slide on said support, means for rotating said arbor, and means in said chamber for urging said conically tapered member along said support in a direction to frictionally grip the same.

2. Apparatus for shrinking a conically tapered member on a correspondingly tapered support, comprising a closed chamber, means for evacuating said chamber, a rotatable arbor in said chamber, means for securing said tapered support to said arbor while leaving said conically tapered member free to slide on said support, means for rotating said arbor, and a bellville spring carried by said arbor and acting to exert resilient pressure on said conically tapered member for resiliently urging same along said support in a direction to frictionally grip the same.

3. The method of assembling a rotatable body having an inner member and an outer member adapted to engage one another frictionally so as to be rigid in use, said inner member having an outer surface arranged for frictional contact with an inner surface of said outer member, and said outer surface being initially of a larger average diameter than that of said inner surface, so that said members cannot as made initially be assembled to the final desired relative position, and wherein said members after assembly and in use are intended for rotation at speeds up to a predetermined service speed, which comprises the steps of positioning said members coaxially with one another but displaced axially from one another in respect to the final desired relative position thereof, rotating said members about their common axis at substantially the same speed, which latter speed is materially in excess of said predetermined service speed, to expand said outer member by centrifugal force, relatively axially moving said members while they are rotating at said excess speed to the final desired relative position of said members in an axial direction, and thereafter reducing and stopping the rotation of said members to effect a cessation of centrifugal force acting thereon, causing said outer member to shrink on said inner member and to maintain an adequate frictional grip thereon at service speeds.

4. The method of assembling a rotatable body having an inner and an outer member adapted to engage one another frictionally so as to be rigid in use, said inner member having a conically tapered outer surface arranged for frictional contact with the correspondingly tapered inner surface of said outer member, which outer surface is initially of a larger average diameter than said inner surface, so that said members cannot as made initially be assembled to the final desired relative position, and wherein said members after assembly and in use are intended for rotation at speeds up to a predetermined service speed, which comprises the steps of positioning said members coaxially with one another and telescoped to an extent permitted by the relative dimensions of their corresponding conical surfaces, rotating said members about their common axis at substantially the same speed, which latter speed is materially in excess of said predetermined service speed, to expand said outer member by centrifugal force, relatively axially moving said members while they are rotating at said excess speed to the final desired relative position of said members in an axial direction, and thereafter reducing and stopping the rotation of said members to effect a cessation of centrifugal force acting thereon, causing said outer member to shrink on said inner member and to maintain an adequate frictional grip thereon at service speeds.

5. The method of assembling a rotatable body having an inner sleeve member and an outer member adapted to engage one another frictionally so as to be rigid in use, said inner member having an outer surface arranged for frictional contact with the inner surface of said outer member, and said outer surface of said inner member being initially of a larger average diameter than that of said inner surface of said outer member, so that said members cannot as made initially be assembled to their final desired relative position, and wherein said members after assembly and in use are intended for rotation at speeds up to a predetermined service speed, which comprises the steps of positioning said members coaxially with one another but displaced axially from one another in respect to the final desired relative position thereof, rotating said members about their common axis at substantially the same speed, which latter speed is materially in excess of said predetermined service speed, to expand said outer member by centrifugal force, relatively axially moving said members while they are rotating at said excess speed to the final desired relative position of said members in an axial direction and thereafter reducing and stopping the rotation of said members to effect a cessation of centrifugal force acting thereon, causing said outer member to shrink on said inner member and to maintain an adequate frictional grip thereon at service speeds.

6. The method of assembling a supercharger impeller having an inner member and an outer member adapted to engage one another frictionally so as to be rigid in use, said inner member having an outer surface arranged for frictional contact with the inner surface of said outer member, and said outer surface of said inner member being initially of a larger average diameter than that of said inner surface of said outer member, so that said members cannot as made initially be assembled to their final desired relative position, and wherein said members after assembly and in use are intended for rotation at speeds up to a predetermined service speed, which comprises the steps of positioning said members coaxially with one another but displaced axially from one another in respect to the final desired relative position thereof, rotating said members about a common axis at substantially the same speed, which latter speed is materially in excess of said predetermined service speed, to expand said outer member by centrifugal force, relatively axially moving said members while they are rotating at said excess speed to the final desired relative position of said members in an axial direction, and thereafter reducing and stopping the rotation of said members to effect a cessation of centrifugal force acting thereon, causing said outer member to shrink on said inner member and to maintain an adequate frictional grip thereon at service speeds.

7. The method of assembling a supercharger impeller having an inner member and an outer member adapted to engage one another frictionally so as to be rigid in use, said inner member having an outer surface arranged for frictional contact with the inner surface of said outer member, and said outer surface of said inner member being initially of a larger average diameter than that of said inner surface of said outer member, so that said members cannot as made initially be assembled to their final desired relative position, and wherein said members after assembly and in use are intended for rotation at speeds up to a predetermined service speed, which comprises the steps of positioning said members coaxially with one another but displaced axially from one another in respect to the final desired relative position thereof, rotating said members while contained in an evacuated chamber about their common axis at substantially the same speed, which latter speed is materially in excess of said predetermined service speed, to expand said outer member by centrifugal force, relatively axially moving said members while they are rotating at said excess speed to the final desired relative position of said members in an axial direction, and thereafter reducing and stopping the rotation of said members to effect a cessation of centrifugal force acting thereon, causing said outer member to shrink on said inner member and to maintain an adequate frictional grip thereon at service speeds, and finally removing the assembled impeller from the evacuated chamber.

8. The method of assembling a supercharger impeller having an inner member and an outer member adapted to engage one another frictionally so as to be rigid in use, said inner member having an outer surface arranged for frictional contact with the inner surface of said outer member, and said outer surface of said inner member being initially of a larger average diameter than that of said inner surface of said outer member, so that said members cannot as made initially be assembled to their final desired relative position, and wherein said members after assembly and in use are intended for rotation at service speeds of about 24,570 R. P. M. which comprises the steps of positioning said members coaxially with one another but displaced axially from one another in respect to the final desired relative position thereof, rotating the members, while they are contained in an evacuated chamber, about their common axis at substantially the same speed of about 32,500 R. P. M. which is materially in excess of the service speeds, to expand said outer member by centrifugal force, relatively axially moving said members while they are rotating at said excess speed to the final desired relative position of said members in an axial direction, and reducing and stopping the rotation of said members to effect a cessation of centrifugal force acting thereon, causing said outer member to shrink on said inner member and to maintain an adequate frictional grip thereon at service speeds, and thereafter removing the assembled impeller from the evacuated chamber.

9. The method of assembling a supercharger impeller having an inner sleeve stub shaft member and an outer impeller member adapted to engage one another frictionally so as to be rigid in use, said inner sleeve member having a conically tapered outer surface arranged for frictional contact with the corresponding conically tapered inner surface of said outer impeller member, and said outer surface of said inner member being initially of larger average diameter than that of said inner surface of said outer member, so that said members cannot as made initially be assembled to their final desired relative position, and wherein said supercharger impeller after assembly and in use is intended for rotation at service speeds of the order of 24,570 R. P. M., which comprises the steps of positioning said members coaxially with one another and telescoped to an extent permitted by the relative dimensions of their corresponding conical surfaces, rotating said members about their common axis, while contained in an evacuated chamber, at substantially the same speed, which latter speed is of the order of 32,500 R. P. M. and which is substantially in excess of said service speed, to expand said outer impeller member by centrifugal force, relatively axially moving said members while they are rotating at said excess speed to the final desired relative position of said members in an axial direction, and reducing and stopping the rotation of said members to effect a cessation of centrifugal force acting thereon, causing the outer impeller member to shrink on the inner sleeve stub shaft member and to maintain an adequate frictional grip thereon at service speeds.

10. In a supercharger impeller assembly adapted to be rotated at high service speeds, comprising a hub which frictionally engages a stub shaft sleeve which is internally splined to mesh with splines on an engine shaft, a retaining collar disposed at one end of the stub shaft sleeve abutting against a ledge on said engine shaft and a flanged retaining ring disposed at the other end of the stub shaft sleeve abutting against a collar splined on the engine shaft and a spanner nut threaded on the engine shaft to retain the assembled parts, whereby the impeller is restrained from longitudinal movement on the engine shaft.

11. In a supercharger impeller assembly adapted to be rotated at high service speeds, comprising an impeller which frictionally engages the engine shaft, retaining collars disposed at the ends of the impeller hub, a plurality of upstanding peripheral lugs integral with one of said retaining collars, said lugs engaging corresponding slots formed in the face of the impeller hub, whereby a positive driving connection is provided between the shaft and the impeller.

12. In a supercharger impeller assembly adapted to be rotated at high service speeds, comprising an impeller having a tapered conical bore frictionally engaging a stub shaft sleeve having a correspondingly conically tapered outer surface, an annular recess in the inner large annulus of the stub shaft, whereby flexibility is imparted to the stub shaft to relieve the relatively tight frictional fit.

13. A composite rotatable body adapted to be rotated at high service speeds, comprising an inner member and an outer member frictionally engaging one another, said outer member having an annular, inner radial zone having a permanent deformation and an outer annular zone contiguous therewith having the initial form imparted thereto without permanent deformation and hence having a greater ability to contract to its original shape on cessation of centrifugal forces acting thereon due to its rotation in use than said inner zone.

14. A composite rotatable body adapted to be rotated at high service speeds, comprising an inner member and an outer member frictionally engaging one another, said outer member having an annular, inner radial zone having a permanent deformation due to its having been stressed by centrifugal force above the elastic limit of the material of said inner zone, and an outer annular zone contiguous therewith having the initial form imparted thereto without permanent deformation and hence having a greater ability to contract to its original shape on cessation of centrifugal forces acting thereon due to its rotation in use than said inner zone.

15. A composite rotatable body adapted to be rotated at high service speeds above 20,000 R. P. M., comprising an inner member of steel and an outer member of aluminum alloy, said members frictionally engaging one another, said outer member having an annular, inner radial zone having a permanent deformation due to its having been stressed by centrifugal force due to rotation at a speed materially above the intended service speed and above the elastic limit of the material in said inner zone, and an outer annular zone for said outer member contiguous with said inner zone and having an initial form imparted thereto unchanged by the effect of any stress temporarily effective thereon due to centrifugal force, the material of said outer zone having a greater ability to contract to its original shape on cessation of centrifugal force acting thereon due to its rotation in use than said inner zone.

16. The method of assembling a composite body adapted for rotation up to a predetermined high service speed having an inner member, the radial outer surface portions of which all lie in a single smooth frusto-conical surface, and an outer member having an inner complementary frusto-conical surface intended frictionally to engage the first-named frusto-conical surface so as to hold said members together solely by said frictional engagement, and wherein the internal diameter of said outer member prior to the assembly of said members is less than the outer diameter of said inner member at a corresponding plane in respect to said members after assembly, comprising the steps of positioning said members in coaxial relation and as close to their final assembled position as is permitted by their relative dimensions aforesaid, rotating said members about their common axis at a speed substantially in excess of said service speed to expand said outer member uniformly by centrifugal force, relatively axially moving said members while they are rotating at said excess speed to bring them to a final desired relative axial position, and thereafter reducing and stopping the rotation of said members so as to permit said outer member to shrink upon said inner member.

ALBERT M. ROCKWELL.
ALBERT H. BEAUFRERE.

REFERENCES CITED

The following references are of record in the file of this patent:

UNITED STATES PATENTS

| Number | Name | Date |
|---|---|---|
| 1,973,554 | Bentley | Sept. 11, 1934 |
| 2,222,787 | Stadler | Nov. 26, 1940 |

Certificate of Correction

Patent No. 2,438,866.  March 30, 1948.

ALBERT M. ROCKWELL ET AL.

It is hereby certified that error appears in the printed specification of the above numbered patent requiring correction as follows: Column 5, line 65, for the words "will result" read *still results*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*